US006385456B2

(12) United States Patent
Menzel

(10) Patent No.: US 6,385,456 B2
(45) Date of Patent: May 7, 2002

(54) METHOD AND SYSTEM OF TRANSMITTING DATA IN A CELLULAR RADIO SYSTEM

(75) Inventor: Christian Menzel, Maisach (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/101,231

(22) PCT Filed: Dec. 17, 1996

(86) PCT No.: PCT/DE96/02431

§ 371 Date: Jul. 2, 1998

§ 102(e) Date: Jul. 2, 1998

(87) PCT Pub. No.: WO97/25827

PCT Pub. Date: Jul. 17, 1997

(30) Foreign Application Priority Data

Jan. 4, 1996 (DE) .......................................... 196 00 197
Nov. 29, 1996 (DE) .......................................... 196 49 667

(51) Int. Cl.[7] ................................................. H04Q 7/20
(52) U.S. Cl. ....................... 455/452; 455/435; 370/335; 375/146
(58) Field of Search ................................ 455/423, 437, 455/436, 438, 439, 403, 452, 560, 435; 370/335, 336, 337; 375/206, 146

(56) References Cited

U.S. PATENT DOCUMENTS

| 5,251,216 | A | * | 10/1993 | Marshall et al. ............. 370/337 |
| 5,327,576 | A | * | 7/1994 | Uddenfeldt et al. ......... 455/33.2 |
| 5,533,014 | A | * | 7/1996 | Willars et al. ................. 370/18 |
| 5,590,405 | A | * | 12/1996 | Daly et al. ................... 455/54.1 |
| 5,621,720 | A | * | 4/1997 | Bronte et al. .................. 370/13 |
| 5,634,192 | A | * | 5/1997 | Meche et al. ................ 455/437 |
| 5,721,725 | A | * | 2/1998 | Want et al. .................. 370/236 |
| 5,754,961 | A | * | 5/1998 | Serizawa et al. ............ 455/517 |
| 5,802,465 | A | * | 9/1998 | Hamalainen et al. ........ 455/403 |
| 5,818,829 | A | * | 10/1998 | Raith et al. .................. 370/347 |
| 5,907,555 | A | * | 5/1999 | Raith .......................... 370/468 |
| 6,047,171 | A | * | 4/2000 | Khayrallah et al. ......... 455/266 |
| 6,111,863 | A | * | 8/2000 | Rostoker et al. ............ 370/329 |

FOREIGN PATENT DOCUMENTS

| EP | 0530165 | * | 8/1992 |
| EP | 0 530 165 A2 | | 3/1993 |
| EP | 0 662 778 A2 | | 7/1995 |
| FI | WO 94-13113 | * | 6/1994 |
| WO | WO 91/02436 | | 1/1991 |
| WO | WO 94/01974 | | 1/1994 |
| WO | WO-94-01974 | * | 1/1994 |
| WO | WO 94/13113 | | 6/1994 |
| WO | WO 94/29981 | | 12/1994 |

OTHER PUBLICATIONS

D900 Mobile Communication System—system Description SYD A30808–X3231–X–2–7618 pp. 1–75.

* cited by examiner

Primary Examiner—Nay Maung
Assistant Examiner—Joy K. Contee
(74) Attorney, Agent, or Firm—Bell, Boyd & Lloyd LLC

(57) ABSTRACT

A method and system of transmitting data in a cellular radio system wherein in order to transmit data packets in a cell between a base station and a mobile station of a cellular radio system corresponding to a time division multiplex method in time slots of a time division multiplex frame, after one prescribed time period, the transmission of the data is reduced during one time interval. During these time intervals, base stations in adjacent cells are radio-monitored.

6 Claims, 3 Drawing Sheets

METHOD AND SYSTEM OF TRANSMITTING DATA IN A CELLULAR RADIO SYSTEM

BACKGROUND OF THE INVENTION

1. Field of the Invention

The present invention relates to a method and system of transmitting data in a cellular radio system, as well as relates to a corresponding subscriber station and central station.

2. Description of the Prior Art

In a mobile radio system, an area to be supplied is usually divided into a large number of radio cells. In each of these radio cells there is provided a base station via which the connections between a public telephone network and the subscriber stations of the individual subscribers, for example mobile stations, in the respective cell can be established. Such a mobile radio system is, for example, the GSM (Global System for Mobile Communication) standardized by the European Telecommunications Standards Institute (ETSI). Such a system is described, for example, in a brochure "D 900 Mobile Communication System" SYD from Siemens AG, 1992. A similar system is the DCS 1800/PCN.

In the mobile radio station illustrated in FIG. 5, a radio region is divided up, in accordance with the GSM standard, into a plurality of cells Z, of which only the cells Z1 to Z7 are illustrated in FIG. 5. In a cell Z, the telecommunications service from and to a mobile station MS is made available by means of a base station BTS (BTS=Base Transceiver Station) which is part of a central station. In FIG. 5, only the base stations BTS1 to BTS3 assigned to the cells Z1 to Z3 are illustrated. One or more base stations BTS are connected to a base control unit BTSC (BTSC=Base Station Controller), of which only the base control units BTSC1 and BTSC2 are illustrated in FIG. 5. The base control units BTSC perform the local functions of call switching, monitoring and maintenance. They include, in particular, control units BCE (Base Station Control Equipment). A plurality of base control units BTSC are connected to a switching device SSS (SSS=Switching Subsystem) which is itself connected to the public network PSTN (PSTN=Public Switched Telephone Network). The PSTN Public Network can be designed as an ISDN network, as a mobile radio network or as some other telephone or data network.

If a subscriber wishes to communicate with another subscriber by means of a mobile station MS in the cell Z1, a prescribed protocol is processed via the base station BTS1 with the base control unit BTSC1, which protocol is defined, for example, in the abovementioned GSM standard. When the connection between the mobile station MS and the base control unit BTSC1 has been established, a connection is established to the public network PSTN via the switching device SSS. From this public network PSTN, the other subscriber, who may be provided with a mobile station, is then reached.

In the GSM, the signals are usually transmitted using the so-called TDMA (Time Division Multiple Access) method in a frequency and time division multiple access. In this method, the data, which may also include digitalized voice, are transmitted via time slots of a TDMA frame.

During the transmission of the data, the mobile station observes the radio field conditions of the adjacent base stations so that, if appropriate, a handover to another base station can be performed on the basis of these measurements.

In order to obtain relatively high data rates during transmission between the mobile station and the network, a plurality of time slots of the TDMA frame may be used for the same connection. However, this shortens the time period in which a mobile station can observe the adjacent base stations. If, for example, all the time slots of a TDMA frame are used for a connection, it may be completely impossible to observe the adjacent base stations. In order, to ensure that a observation takes place, it would be conceivable to provide a second receiver to monitor the adjacent base stations in the mobile station, wherein the receiver would be used, to observe the adjacent base stations. However, such a solution has the disadvantage that it requires a relatively large expenditure and increases the volume of the mobile station.

EP 662 778 A2 discloses the Asynchronous Transfer Mode (ATM) for transmitting permanently prescribed data packets by mobile radio. The monitoring of neighboring cells in a cellular system is not addressed in this known process of transmission.

Furthermore, WO 91-2436 A1 describes the provision in each base station of a cellular mobile radio system of devices which detect the temporary pauses in the transmission between the base station and the mobile station and bring about signaling operations with the mobile station during these pauses.

SUMMARY OF THE INVENTION

The present invention is directed to a process and a system by which a connection to a plurality of time slots is established in a simple and cost-effective way and, nevertheless, the use of a second receiver in the mobile station is avoided.

Accordingly, in an embodiment of the present invention, a method is provided of transmitting data in a cellular radio system between a base station in a cell, which is one of a plurality of base stations in a corresponding plurality of cells, and a mobile station where in the transmission occurs in a plurality of time slots of a time division multiplex frame pursuant to a time division multiplex method, the method including the steps of: determining a first data rate time period; transmitting data at a first data rate over a first number of time slots for the duration of the first data rate time period; monitoring base stations in adjacent cells during the transmission of data at the first data rate; determining a second at a rate time period; transmitting data at a second data rate over a second number of time slots upon expiration of the first data rate time period and for the duration of the second data rate time period, the second number of time slots being less than the first number of time slots; radio-monitoring the base stations in adjacent cells during the transmission of data at the second data rate; and transmitting data at the first data rate upon expiration of the second data rate time period.

In an embodiment, the method further includes the steps of: successively transmitting data at the second data rate after the expiration of the first data rate time period; and successively radio-monitoring the base stations in adjacent cells during the transmission of data at the second data rate.

In an embodiment, the method further includes the step of determining the first number of time slots pursuant to an agreement between the base station and the mobile station.

In an embodiment, the method further includes the step of transmitting the agreement with a signaling system.

In an embodiment, the method further includes the steps of: determining transmission requirements for the second data rate time period; and using the mobile station to reduce the number of time slots from the first number of time slots to the second number of time slots.

In an embodiment of the present invention, a system is provided for transmitting data in a cellular radio system between a base station and a mobile station where in the transmission occurs in a plurality of time slots in a time division multiplex frame pursuant to a time division multiplex method, the system including: a base station in a cell which is one of a plurality of base stations in a corresponding plurality of cells, the base station transmitting data at a first data rate over a first number of time slots for the duration of a first data rate time period, transmitting data at a second data rate over a second number of time slots upon the expiration of the first data rate time period for the duration of a second data rate time period wherein the second number of time slots is less than the first number of time slots, and again transmitting data at the first data rate upon expiration of the second data rate time period; and at last one mobile station for radio-monitoring the base stations in adjacent cells during the transmission of data at the second data rate.

Additional features and advantages of the present invention are described in, and will be apparent from, the Detailed Description of the Preferred Embodiments and the Drawings.

DETAILED DESCRIPTION OF THE PREFERRED EMBODIMENTS

Although the present invention has been described with reference to a specific embodiments, those of skill in the art will recognize that changes may be made thereto without departing from the spirit and scope of the invention as set forth in the hereafter appended claims.

Figure 1:
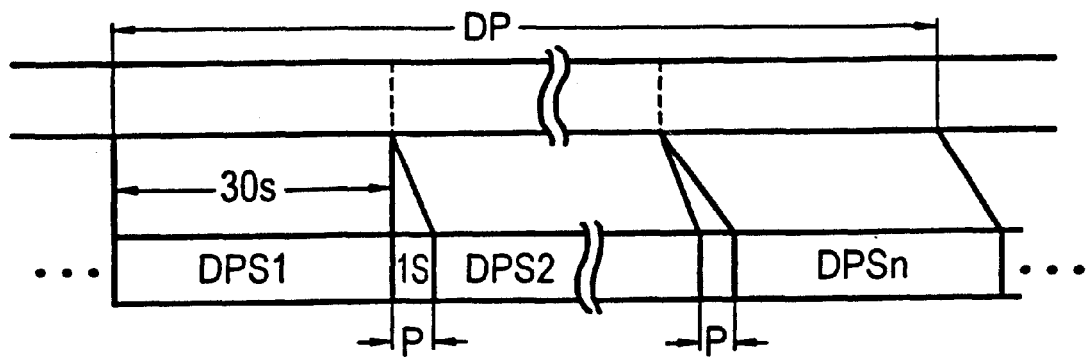
FIG. 1 shows a schematic illustration of data to be transmitted.

The illustration in FIG. 1 shows schematically a data packet DP to be transmitted on the air interface between the mobile station and the base station. This data packet DP is divided up into data packet segments DPS1 to DPSn and which are separated from one another by means of a time interval P of, for example, 1 s, while the data transmission rate to them is reduced. These data packet segments DPS are transmitted simultaneously by means of a corresponding transmission protocol; for example, the so-called modified RLP (Radio Link Protocol) Such transmissions occurs via a plurality, of time slots of a TDMA frame on one frequency.

Figure 2:
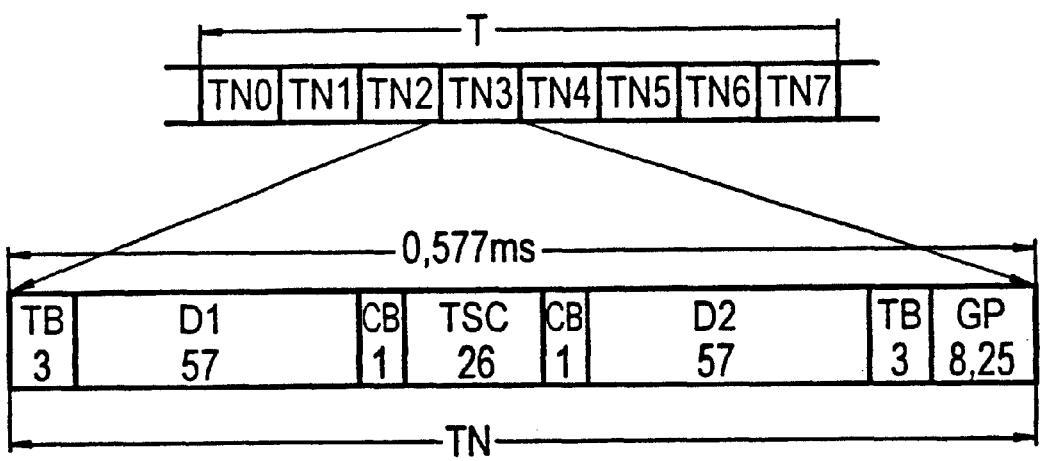
FIG. 2 shows the structure of a time slot frame.

FIG. 2 illustrates the structure of a GSM time slot frame (TDMA frame) T with eight time slots TN0 to TN7. Each time slot frame has a duration of 4.615 ms. Each time slot has a duration of approximately 0.577 ms or 156.25 bits. The physical contents of a time slot are referred to as a burst. There are four different types of bursts in this system:

1. Normal burst: This burst is used to transmit data, voice or monitoring information.
2. Frequency correction burst: This burst is used for frequency synchronization of the mobile station.
3. Synchronization burst: This burst is used for frame synchronization of the mobile station.
4. Access burst: This burst is used for the initial access of the mobile station and at a handover of the mobile station.

A normal burst TN with a duration of 0.577 ms is illustrated in an enlarged form in FIG. 2. It contains 114 encrypted or unencrypted information bits, depending on whether an encryption function is switched on or off. These bursts are divided up into two half bursts D1 and D2 with 57 bits each. In the center of the normal burst there is a 26-bit long training sequence TSC which serves to dimension the channel and/or estimate the channel impulse response of the transmission channel. On each side of the training sequence TSC there is a control bit CB which indicates whether the normal burst contains data or monitoring information. A normal burst begins and ends with three defined additional bits (Tail Bits) TB in each case. A normal burst ends with a protection time (Guard Period) GP of 8.25 bits.

Figure 3:
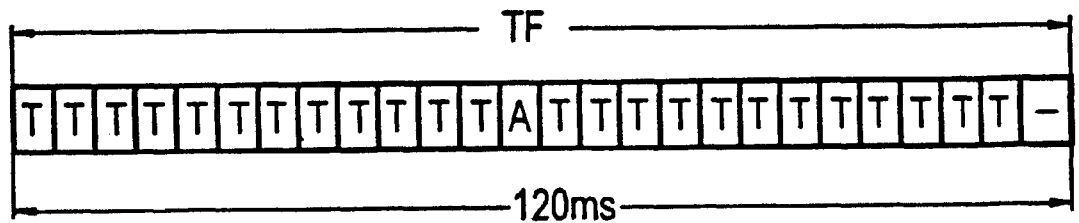
FIG. 3 shows the structure of a frame formed from a plurality of time slot frames.

The traffic data channels in the GSM are arranged in a frame TF consisting of 26 time slot frames (26 frame/multiframe) such as is illustrated in FIG. 3. In twelve successive time slot frames T, namely the time slot frames 0 to 11 and time slot frames 13 to 24, digitalized voice or monitoring information is transmitted. The time slot frame 12 is used to transmit control information A such as parameters for adaptively regulating the performance of the corresponding mobile station, frequencies of the neighboring cells, etc. and cell-specific information. No data is transmitted in the time slot frame 25.

The frame TF, which is illustrated in FIG. 3, corresponds to a duration of 120 ms. Useful information can thus be transmitted in 24 of the 26 time slot frames T. Since 114 bits (normal burst) can be transmitted in each time slot TN, 114×24=2736 information bits are therefore transmitted during a 120 ms-long frame. This corresponds to a gross data rate of 22.8 kbit/s.

From 51 such frames TF, a superframe with a duration of 6.12 s is formed for the transmission of useful information a 2048 such superframes form a hyperframe with a duration of 3 h 28 m 53 s 760 s.

Figure 4:
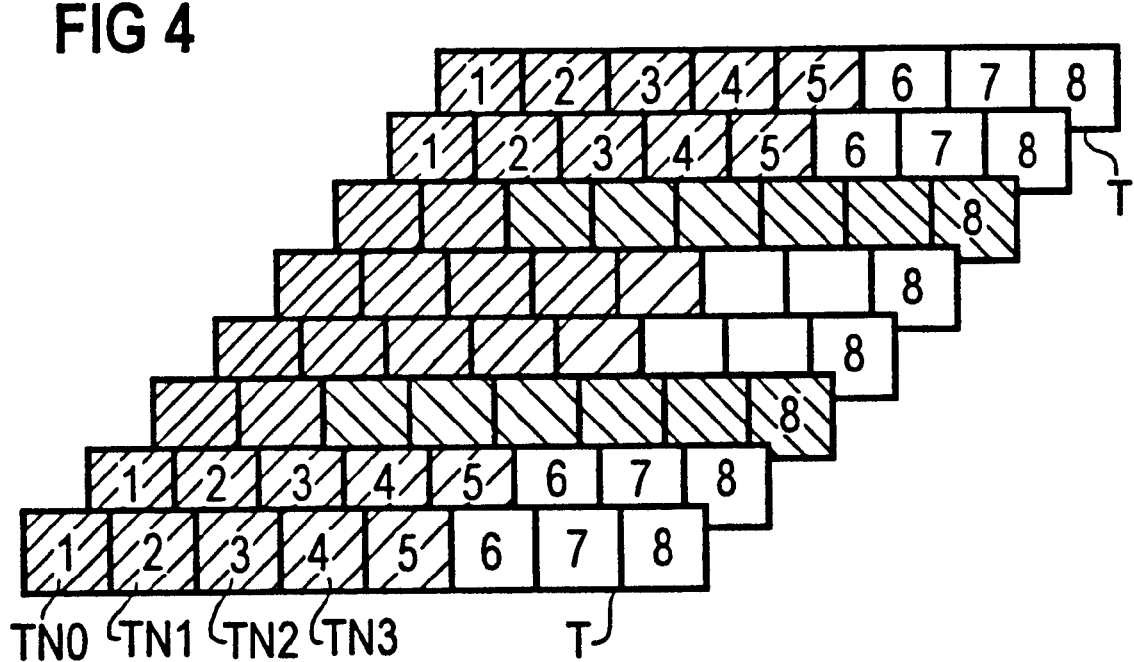
FIG. 4 shows a three-dimensional, schematic illustration of data transmitted simultaneously over a plurality of time slots of a time slot frame wherein the data rate, each case, a briefly reduced during the transmission.
Figure 4:
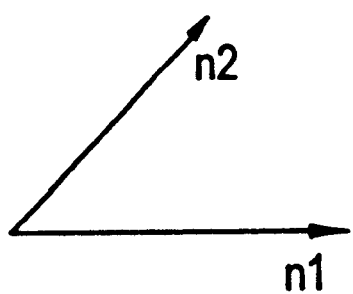
Figure 5:
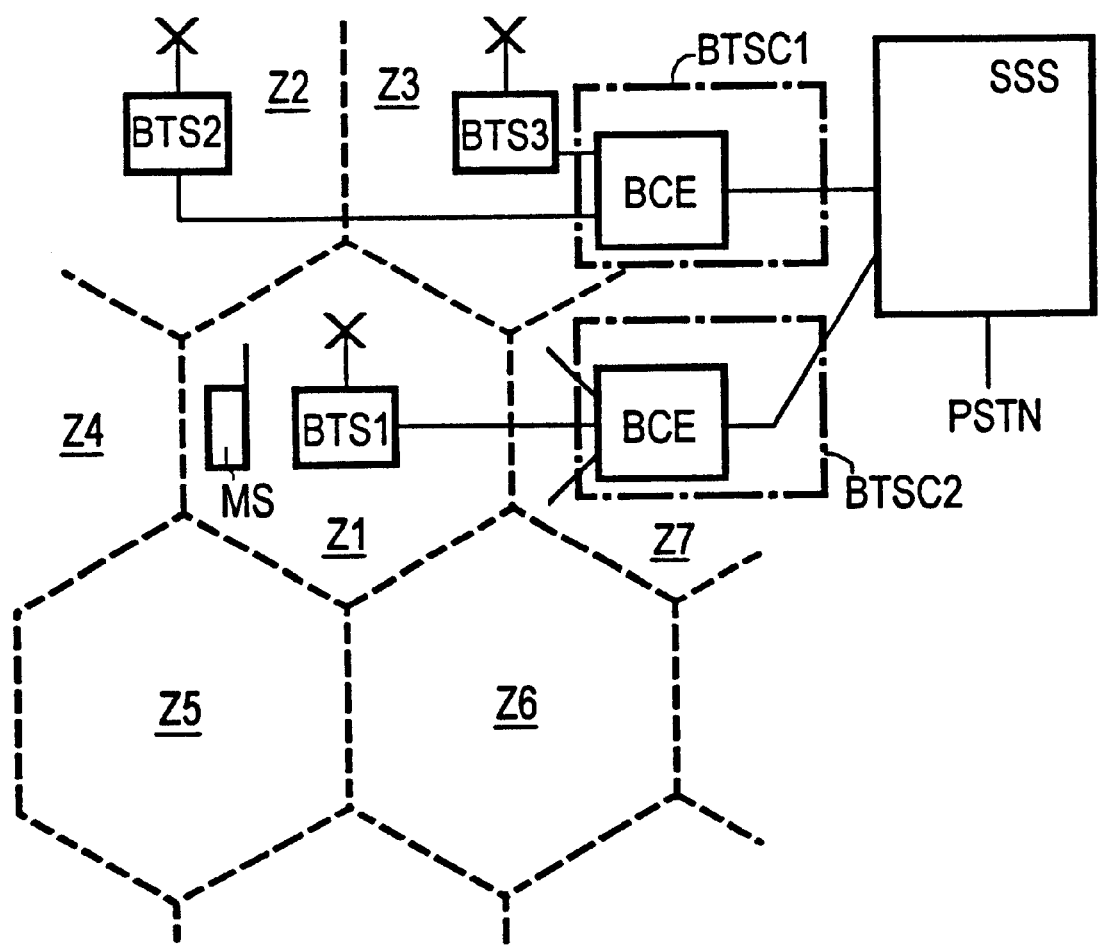
FIG. 5 shows a block diagram of a mobile radio system.

If, for illustrative reasons, the frames T are not illustrated next to one another but rather graphically one behind the other, the illustration according to FIG. 4 is obtained. Here, the time slots TN of the time slot frames T are illustrated on a time axis n1 and the successive time slot frames T are illustrated one behind the other on another time axis n2.

If the data of the data packet segments DPS are not transmitted over in each case one time slot of a time slot frame T but rather over a plurality of time slots TN of a time slot frame T on the same frequency, the data transmission rate is correspondingly increased. In the illustration it is assumed by way of example that the transmission takes place simultaneously over the five time slots TN0 to TN3, which is illustrated by hatching from the bottom left to the top right.

In FIG. 4, only the direction from the base station BTS to the mobile station MS (downlink) is illustrated. The transmissions in the two directions are offset with respect to one another by three time slots TN. If, in each case, only one time slot TN is used for a connection, there remains sufficient time between them to monitor the base stations of the neighboring cells. However, if the transmission of data takes place in parallel simultaneously in a plurality of time slots TN, there remains no further time for observing the neighboring cells.

If the transmission duration of each data packet segment DPS with a high transmission rate is limited in time, the time intervals P illustrated in FIG. 1 between the transmissions of the successive data packet segments DPS are used for observing the neighboring cells. When transmitting data to the mobile station MS it is in any case expedient to set up and release the connection for the purposes of routing and avoiding handovers during the data transmission.

The time period of the data packet segments DPS illustrated in FIG. 1, is for example, 30 s. This ensures that neighboring-cell observation takes place at the latest after, for example, 30 s in each case. This corresponds to the time period after which, in the case of GSM, a cell selection (cell reselection) is carried out if the mobile station MS is in a battery saving mode or in a no-load mode. The behavior and the accessibility of the mobile station MS are thus not adversely affected. In addition, the net data rate is reduced only slightly. However, it is significant that with the process indicated, in particular, a second receiver is not necessary in the mobile station MS.

Instead of monitoring of all the adjacent base stations BTS after, in each case, one data packet segment DPS with the time period of 30 s, the adjacent base stations BTS can also be successively monitored after in each case a relatively short time period in the time interval P.

Then, too, it is ensured that all the adjacent base stations BTS are radio-monitored after in each case a prescribed time period.

In the illustration in FIG. 4, the data transmission rate is briefly reduced during the ongoing connection. The time slot frames in which this takes place are indicated by hatching from left bottom to top right. For this purpose, the number of time slots TN which are used for the transmission of data is briefly reduced. For example, the transmission of data during one or a small number of time slot frames T is reduced. As a result, there is sufficient time available to acquire the measured values.

In the illustration in FIG. 4, for example, five time slots TN are provided in each case for normal transmission of data. If the neighboring cells are to be monitored, the number of time slots TN during a time interval is reduced to, for example, two so that transmission continues only to the time slots TN0 and TN1. The number of time slots TN used for the transmission can be reduced here according to a permanently agreed plan, the agreed plan then being transmitted, for example, by means of the signaling system. The reduction can also be performed, in each case, by the mobile station MS depending on the requirements. In this case, a dependability protocol may be required which detects the loss of the data which have not been received owing to the monitoring of a neighboring cell and, if appropriate, requests their repetition. The data are therefore usually transmitted in data blocks which themselves can be distributed again over a plurality of bursts (for example by means of so-called interleaving).

The time slots selected for monitoring the neighboring cells are preferably ones which can be used for monitoring bursts of a block. As a result, the number of disrupted blocks is reduced. In the permanently agreed plan, such preventive measures are not necessary since the transmit side and the receive side each know a priori at which times the mobile station MS is not ready to receive in specific time slots TN.

The transmission can also be combined with a dynamic load distribution in which the data blocks to be transmitted are distributed between the time slots TN associated with the various channels, in such a way that more data blocks are transmitted over channels with a high transmission quality, few repetitions and thus a high data throughput rate than over channels with a low transmission quality and a small data throughput rate. A channel whose time slots TN are used for monitoring the neighboring cells has, in the case of the agreed plan, a data throughput rate which is known and which, in the case of monitoring, appears in accordance with requirements as a channel with a poor transmission rate, and thus likewise low data throughput rate.

The load distribution mechanism, which may be for example a connection protocol modified for multiple access transmissions, distributes, in accordance with the possible data throughput rate, the data to be transmitted, between the traffic channels associated with a connection. Although the present invention has been described with reference to specific embodiments, those of skill in the art will recognize that changes may be made thereto without departing from the spirit and scope of the invention as set forth in the hereafter appended claims.

What is claimed is:

1. A method of transmitting data in a cellular radio system between a base station in a cell, which is one of a plurality of base stations in a corresponding plurality of cells, and a mobile station wherein the transmission occurs in a plurality of time slots of a time division multiplex frame pursuant to a time division multiplex method, the method comprising the steps of:

determining a first data rate time period;

transmitting data at a first data rate over a first number of allocated time slots for the duration of the first data rate time period;

radio-monitoring base stations in adjacent cells during the transmission of data at the first data rate over a first number of non-allocated time slots for the duration of the first data rate time period;

determining a second data rate time period;

transmitting data at a second data rate over a second number of allocated time slots upon expiration of the first data rate time period and for the duration of the second data rate time period, the second number of allocated time slots being less than the first number of allocated time slots;

radio-monitoring the base stations in adjacent cells during the transmission of data at the second rate over a second number of non-allocated time slots for the duration of the second data rate time period, the second number of non-allocated time slots being greater than the first number of non-allocated time slots; and transmitting data at the first data rate upon expiration of the second data rate time period.

2. A method of transmitting data in a cellular radio system as claimed in claim 1, further comprising the steps of:

successively transmitting data at the second data rate after the expiration of the first data rate time period; and successively radio-monitoring the base stations in adjacent cells during the transmission of data at the second data rate.

3. A method of transmitting data in a cellular radio system as claimed in claim 1, further comprising the step of:

determining the first number of time slots pursuant to an agreement between the base station and the mobile station.

4. A method of transmitting data in a cellular radio system as claimed in claim 3, further comprising the step of:

transmitting the agreement with a signaling system.

5. A method of transmitting data in a cellular radio system as claimed in claim 1, further comprising the steps of:

determining transmission requirements for the second data rate time period; and using the mobile station to reduce the number of time slots from the first number of time slots to the second number of time slots.

6. A system for transmitting data in a cellular radio system between a base station and a mobile station wherein the transmission occurs in a plurality of time slots in a time division multiplex frame pursuant to a time division multiplex method, the system comprising:

a base station in a cell which is one of a plurality of base stations in a corresponding plurality of cells, the base station transmitting data at a first data rate over a first number of allocated time slots for the duration of a first data rate time period, transmitting data at a second data rate over a second number of allocated time slots upon the expiration of the first data rate time period for the duration of a second data rate time period wherein the second number of allocated time slots is less than the first number of allocated time slots, and again transmitting data at a first data rate upon expiration of the second data rate time period; and at least one mobile station for radio-monitoring base stations in adjacent cells during the transmission of data at first data rate over a first number of non-allocated time slots for the duration of the first data rate time period, and for radio-monitoring the base stations in adjacent cells during the transmission of data at the second data rate over a second number of non-allocated time slots for the duration of the second data rate time period, the second number of non-allocated time slots being greater than the first number of non-allocated time slots.

* * * * *

UNITED STATES PATENT AND TRADEMARK OFFICE
CERTIFICATE OF CORRECTION

PATENT NO.     : 6,385,456 B2
DATED          : May 7, 2002
INVENTOR(S)    : Christian Menzel It is certified that error appears in the above-identified patent and that said Letters Patent is hereby corrected as shown below:

<u>Title page,</u>
Item [73], please change the Assignee to -- Siemens Aktiengesellschaft, Munich (DE) --.

Signed and Sealed this

Twenty-sixth Day of August, 2003

JAMES E. ROGAN
*Director of the United States Patent and Trademark Office*